US006574631B1

(12) United States Patent
Subramanian et al.

(10) Patent No.: US 6,574,631 B1
(45) Date of Patent: Jun. 3, 2003

(54) METHODS AND SYSTEMS FOR RUNTIME OPTIMIZATION AND CUSTOMIZATION OF DATABASE APPLICATIONS AND APPLICATION ENTITIES

(75) Inventors: Sowmya Subramanian, Palo Alto, CA (US); Supreet Oberoi, Redwood Shores, CA (US); Arthur Mohan, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 372 days.

(21) Appl. No.: 09/634,980

(22) Filed: Aug. 9, 2000

(51) Int. Cl.[7] .............................. G06F 17/00; G06F 7/00
(52) U.S. Cl. ........................................ 707/101; 707/102
(58) Field of Search ................................ 707/100, 101, 707/102, 104.1

(56) References Cited

U.S. PATENT DOCUMENTS

| | | | | |
|---|---|---|---|---|
| 5,566,330 A | * | 10/1996 | Sheffield ........................ 707/4 |
| 5,799,310 A | * | 8/1998 | Anderson et al. ............ 707/102 |
| 5,937,409 A | * | 8/1999 | Wetherbee ............... 707/103 R |
| 6,061,515 A | * | 5/2000 | Chang et al. ................ 717/114 |
| 6,085,198 A | * | 7/2000 | Skinner et al. .......... 707/103 R |
| 6,108,664 A | * | 8/2000 | Nori et al. ............... 707/103 R |
| 6,128,621 A | * | 10/2000 | Weisz ....................... 707/103 Y |
| 6,237,003 B1 | * | 5/2001 | Lewish et al. ............... 707/101 |
| 6,460,042 B1 | * | 10/2002 | Hichcock et al. ............. 707/10 |

* cited by examiner

*Primary Examiner*—Greta Robinson
*Assistant Examiner*—Susan F. Rayyan
(74) *Attorney, Agent, or Firm*—Young Law Firm, P.C.

(57) ABSTRACT

A computer-implemented method of customizing a database application at runtime includes steps of storing a value associated with a new attribute in an attribute table. The attribute table is configured as a logical extension of a base table that is configured to store values associated with a number of base attributes. The definitions of the new attributes may be stored in an attribute metadata table that is adapted to store the definition of each of the new attributes of the attribute table. A base-attribute pair may be stored in a base-attribute mapping table, the base-attribute pair mapping the name of the base table to the name of the attribute table. An extended attribute may also be stored in an extended attribute table, the extended attribute table including a name column configured to store the extended attribute and a value column configured to store an extended attribute value corresponding to the extended attribute. Rows of the extended value table may be mapped to corresponding rows in the base table. A rule may be stored in a rules table, the evaluation of the rule determining whether the extended attribute value in the extended attribute table is valid.

45 Claims, 4 Drawing Sheets

| USER | STREET ADDRESS | CITY | ZIP | AGE | SSN |
|------|----------------|------|-----|-----|-----|
|      |                |      |     |     |     |
|      |                |      |     |     |     |
|      |                |      |     |     |     |
|      |                |      |     |     |     |
|      |                |      |     |     |     |
|      |                |      |     |     |     |

| USER | STREET ADDRESS | CITY | ZIP | AGE | SSN | CELL PHONE # |
|------|----------------|------|-----|-----|-----|--------------|
|      |                |      |     |     |     |              |
|      |                |      |     |     |     |              |
|      |                |      |     |     |     |              |
|      |                |      |     |     |     |              |
|      |                |      |     |     |     |              |
|      |                |      |     |     |     |              |

| USER | STREET ADDRESS | CITY | ZIP | AGE | SSN | FF1 | ... | FFn-1 | FFn |
|------|----------------|------|-----|-----|-----|-----|-----|-------|-----|
|      |                |      |     |     |     |     |     |       |     |
|      |                |      |     |     |     |     |     |       |     |
|      |                |      |     |     |     |     |     |       |     |
|      |                |      |     |     |     |     |     |       |     |
|      |                |      |     |     |     |     |     |       |     |

EXTENDED ATTRIBUTE TABLE ⎯ 610

| NAME | VALUE |
|---|---|
| FAVORITE BEACH | HALF MOON BEACH |
| FAVORITE CAR | CITROEN 2CV |
| ... | ... |
|  |  |

RULES TABLE ⎯ 620

| BASE ATTRIBUTE | VALUE | OPERATION | CORR. ROW IN EXTENDED ATTRIBUTE TABLE |
|---|---|---|---|
| STATE | CA | = | FAVORITE BEACH |
| AGE | 50 | >= | FAVORITE CAR |
|  |  |  |  |
|  |  |  |  |

*FIG. 6*

METHODS AND SYSTEMS FOR RUNTIME OPTIMIZATION AND CUSTOMIZATION OF DATABASE APPLICATIONS AND APPLICATION ENTITIES

BACKGROUND OF THE INVENTION

1. Field of the Invention

The present invention relates generally to methods and systems for optimizing application entities and customizing database applications at runtime. More particularly, the present invention relates to methods and systems for extending schema objects such as tables in a database without modifying the application source code that accesses the tables.

2. Description of the Related Art

Businesses typically must store a great deal of information regarding their operations, their customers and other entities with which they have developed a relationship. Database applications (online, World Wide Web-based and others) have been developed to assist businesses in tracking, organizing and otherwise making effective use of such information. Each business, however, is unique and may require the storage of information specific to their business. Moreover, businesses are dynamic entities, constantly evolving as their products change and the marketplace in which they operate evolve. Thus, database applications must be individually configured to conform to the unique requirements of the business that deploys the application.

To configure such database applications according to a customer's specifications conventionally requires that additional columns be added to the relevant database tables to store the requested additional or customer-specific information or attributes. FIG. 1 is a conceptual representation of a schema 110 within a database 100. A schema, such as symbolically represented at 110, is a collection of schema objects. Examples of schema objects include tables and the relationships between the tables, views, sequences, synonyms, clusters, database links, snapshots, procedures, functions and packages. Tables store data in rows and columns and may be thought of as a basic unit of storage in a database. A table may be created by defining a table name and a set of columns. Each column may be given a column name, a datatype and a width (which may be predetermined by the datatype) or a width and scale (for columns of the Number type, for example). A row of a table is a collection of column information corresponding to a single record. FIG. 2 shows an example of such a database table. The illustrative table of FIG. 2 includes 6 columns, each defined to hold a value such as user, street address, city, zip, age and social security number (SSN), for example. The customer deploying an application accessing such a table may wish to store additional information, such as the user's cell phone number, for example. FIG. 3 shows an example of a table in which a column for a new attribute (in this case the user's cell phone number) has been added. Adding many such additional columns in this manner, however, may create enormous tables that expand horizontally (as indicated by the arrow in FIG. 3) as additional columns are added to store the additional attributes. In turn, expanding database tables horizontally may cause an inherent column limit to be reached and results in large and sparsely populated tables, as not all attributes that are added are applicable to each row of the table. Such instance specific attributes require a mechanism to be defined to identify the condition or conditions on which the additional attributes are to be enabled. Moreover, adding columns to existing tables to store the desired additional attributes requires that the application source code (which may be written in the JAVA programming language, for example) be modified to access and operate upon the added columns. The modification of the database application may be carried out upon the initial installation and deployment of the application at the business customer site. Alternatively, such application configuration modification may occur periodically, as the business customer's needs change. Unfortunately, each such application configuration modification may require costly changes to the table structure within the schema and costly changes to the underlying application source code, each of which typically necessitates that the database application be shut down during the update and subsequent recompilation of the database application source code.

Previous efforts at customizing database applications involved the use of a predetermined number of so-called flex (flexible) field columns, as shown at FF1 to FFn in FIG. 4. These pre-installed flex fields are extra columns that are not initially defined when the application is shipped to the customer. These columns may then be configured at the time of installation, to enable the table and the application to address the customer's specific business needs. However, flex field columns are generally definable only at installation time and not at runtime. Moreover, the number of such pre-created flex fields is necessarily limited. If the scope of the application customization required by the customer causes the number of needed flex fields to exceed the number of available flex fields, extensive and costly modifications may be necessary, as detailed above.

What are needed, therefore, are methods and systems to enable changes to be made to such database applications at runtime, without the need to incur the high costs associated with modifying the database tables and/or the application source code.

SUMMARY OF THE INVENTION

It is, therefore, an object of the present invention to provide methods and systems for enabling changes to be made to database applications and application entities such as tables at runtime.

In accordance with the above-described objects and those that will be mentioned and will become apparent below, an embodiment of a method of customizing a database application at runtime, the database application being adapted to access a base table configured to store values associated with a first selected number of base attributes, according to the present invention, includes steps of storing a value associated with a new attribute in an attribute table, the attribute table being configured as a logical extension of the base table and being adapted to store values associated with n new attributes, and storing a definition of the new attribute in an attribute metadata table, the attribute metadata table being adapted to store a definition of each of the n new attributes of the attribute table.

According to further embodiments, each row in the base table maps to a corresponding row in the attribute table. The attribute table may be configured to maintain a number of rows that is equal to a number of rows in the base table. The value storing step may store the value in the attribute table as a selected datatype, such as character (char), for example. The method may further include a step of storing a base-attribute pair in a base-attribute mapping table, the base-attribute pair mapping a name of the base table with the name of the attribute table. A step of storing an extended attribute in an extended attribute table may also be carried out, the extended attribute table including a name column configured to store the extended attribute and a value column configured to store an extended attribute value corresponding to the extended attribute. Rows of the extended value table may be mapped to corresponding rows in the base table. One or more rules may be stored in a rules table, an evaluation of the rule(s) determining whether selected extended attribute values in the extended attribute table are valid. The method may also include the step of storing a logical operator, a first operand, a second operand and a selected extended attribute in the rules table. The application of the logical operator to the first and/or second operands may then determine whether the extended attribute value corresponding to the selected extended attribute is valid. The first operand may include a selected base attribute, the second operand may include a selectable base attribute value. The logical operator may be selected from a group including equal to, less than, less than or equal to, greater than and greater than or equal to, for example. Steps of dividing at least one of the base table, the attribute table, the attribute metadata table, the base-attribute mapping table, the extended attribute table and the rules table into respective non-translatable tables and respective translatable tables may also be carried out. The translatable tables may then be translated into one or more selected languages, as and when needed. Information corresponding to a base attribute, a new attribute, an extended attribute and/or metadata for each accessed row in the base table may be pre-fetched and the pre-fetched information may be stored (cached) in a predetermined area of memory (cache memory).

One or more of the following steps may also be carried out: storing an identification of an application that is allowed to access the value associated with the new attribute in the metadata table; storing a description of the new attribute in the metadata table; storing a default value of the new attribute in the metadata table; storing an enabled/disabled status of the new attribute in the metadata table; storing a required/not required status for the new attribute in the metadata table, and/or storing a datatype of the new attribute in the metadata table.

The present invention is also a database schema, comprising a base table, the base table being configured to store base attribute values associated with a first selected number of base attributes; an attribute table, the attribute table being configured as a logical extension of the base table and being adapted to store new attribute values associated with new attributes, and an attribute metadata table, the attribute metadata table being adapted to store a definition of each of the n new attributes of the attribute table.

The present invention may also be viewed as a computer system, comprising at least one processor; at least one data storage device; a plurality of processes spawned by said at least one processor, the processes including processing logic for customizing a database application at runtime, the database application being adapted to access a base table configured to store values associated with a first selected number of base attributes, the processes carrying out the steps of: storing a value associated with a new attribute in an attribute table, the attribute table being configured as a logical extension of the base table and being adapted to store values associated with n new attributes; storing a definition of the new attribute in an attribute metadata table, the attribute metadata table being adapted to store a definition of each of the n new attributes of the attribute table.

BRIEF DESCRIPTION OF THE DRAWINGS

FIG. 6 is a representation of an extended attribute table and a rules table, configured according to an embodiment of the present invention.

DESCRIPTION OF THE INVENTION

Functional Description

Definitions:
Profile type: Profile type defines the type of profile information being maintained. For instance, a UserProfile type defines information about users.
Profile object: A profile object is an instance of a profile type. For instance, information about a specific user may be defined in a user profile object.
Base attribute: Base attributes include the generic information maintained by a profile type. Base attributes may be defined for all profile objects of a profile type. For instance, if a user's name and address are base attributes of profile objects of type UserProfile, then all such user profile objects would include information about these attributes.
Extended attributes: Extended (also called instance-specific) attributes include additional information maintained by a profile type only for some base attribute values. Unlike base attributes, extended attributes may not be defined for all profile objects of a profile type. For instance, if a user profile object includes "Florida" as the value for base attribute "State", then information regarding the extended attribute "Favorite Beach" may be maintained, whereas the extended attribute "Favorite Beach" may not be maintained if the value of the base attribute "State" is "Utah", for example.

The present invention allows database schemas and database applications to be modified at runtime to include fully functional new and extended attributes as well as to define fully functional new base attributes in the schema, without requiring the underlying source code of the application to be modified.

Figure 5:
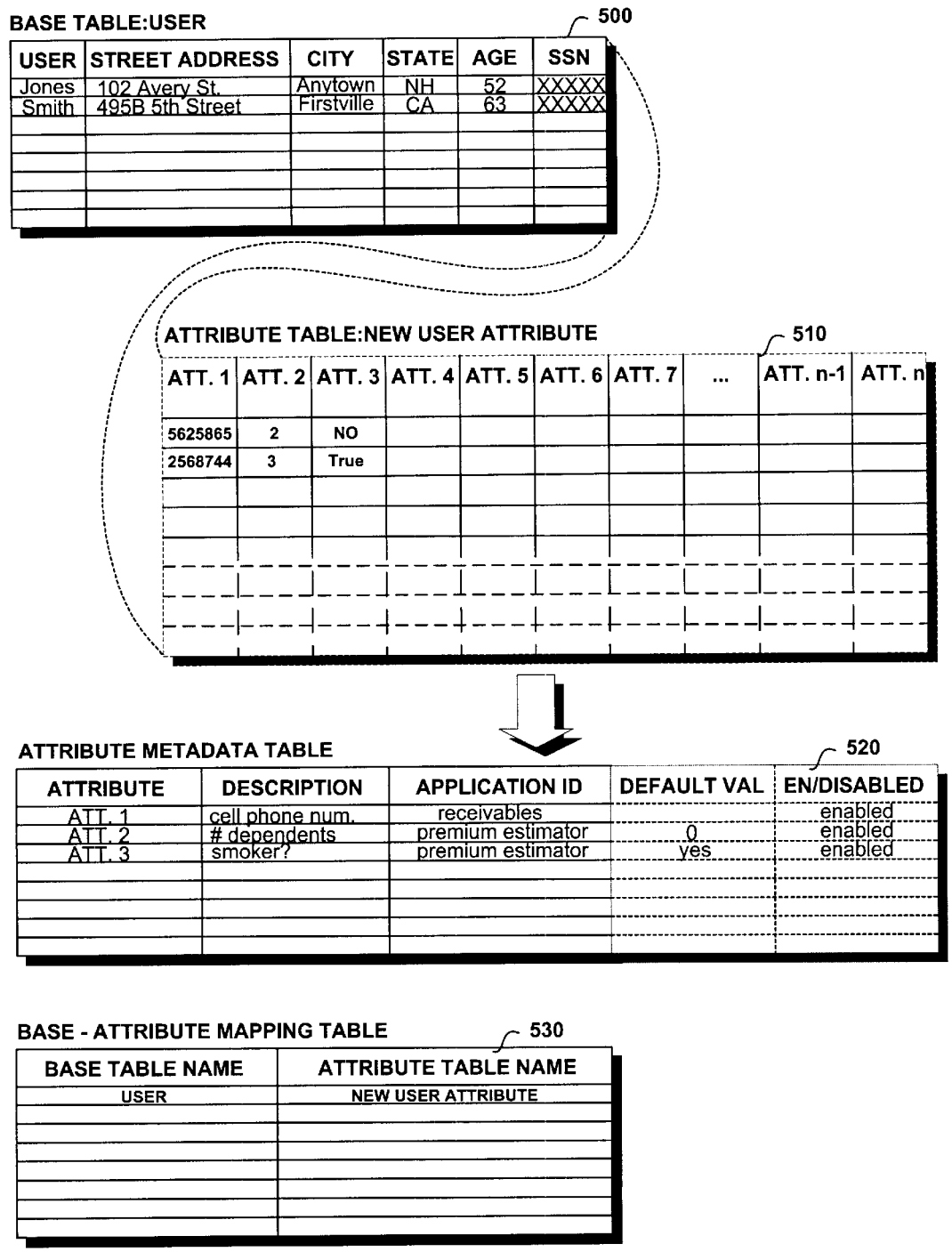
FIG. 5 is a representation of database tables configured according to an embodiment of the present invention.

FIG. 5 is a representation of database tables forming part of a schema, according to an embodiment of the present invention. The base table 500 may include base attributes that are particular to a customer's industry and to the database application that accesses the table 500. As shown in the example of FIG. 5, the base table 500 is a user base table that defines base attributes (User, Street Address, City, Zip, Age and SSN, for example) common to all profile objects of the profile type (UserProfile, for example) to which the table 500 belongs. Other base attributes may be defined, according to the application at hand. For example, should the base table 500 be accessed by an application deployed by an aircraft manufacturer, the base table 500 may include wholly different base attributes, such as airframe number, type, customer, and other avionics-related base attributes, for example.

Instead of adding additional columns to modify the configuration of the base table 500, an embodiment of the present invention provides for another table 510, which may be called an attribute table. The attribute table 510 may include a large number of pre-created attribute columns, generically labeled Att. 1 to Att. n, where n is any number. The pre-created attribute columns may be labeled with such generic names as the column names, according to an embodiment of the present invention, are never visible to the user. The attribute table 510 may include an initial predetermined number of rows, which predetermined number may be increased as needed; i.e., as additional rows are populated in the base table 500. The attribute table 510 may be configured to maintain a number of rows that is equal to the number of rows in the base table 500. Although a separate table, the attribute table 510 may be considered to be a logical extension of the base table 500, in that each row in the base table 500 maps to a corresponding row in the attribute table 510. In other words, the attribute table 510 may have the primary key (keys describe the relationship between the different tables of a relational database) of the base table 500 as a foreign key. The attribute table 510 provides added flexibility for the company deploying the database application that accesses these tables, as no change need be made to the base table 500 to add additional new attributes thereto. The need for such new user attributes may arise upon initial installation of the database application at the customer site, or may arise after the customer's business needs have changed at some later time after installation of the application. As shown in FIG. 5, the rows of the attribute table 510 may be populated with any type of data, whether numerical, alphanumerical, Boolean or date, for example. According to one embodiment of the present invention, the rows of the attribute table 510 may be populated with data of a single datatype, such as a variable or fixed character (alphanumeric) datatype.

The attribute table 510 may not contain, in itself, provide any information as to the meaning of any of new attribute values stored in the Att. 1 to Att. n columns. In other words, although storing the data, the attribute table 510 may not define the meaning or nature of the new attribute values stored therein. This task, according to an embodiment of the present invention, may be relegated to an attribute metadata table 520. Within the context of the present invention, metadata may be defined as data that defines or otherwise provides information regarding some other data. For example, 123-456-7890 is a string that represents some data. Metadata corresponding to this data may be, for example, "Cell Phone Number", in that the metadata "Cell Phone Number" defines the meaning of the data string 123-456-7890 to the accessing application.

The columns of attribute table 510 may generically labeled Att. 1 to Att. n for example (where n is the total number of attribute columns provided), and this generic labeling need not be changed according to the nature or type of the values to be stored therein. The nature, type, definition or meaning of the values stored in the attribute table 510 may be stored and identified, according to the present invention, in an attribute metadata table 520. The attribute metadata table 520, according to the present invention, may store information that the accessing application may require to make full and effective use of the new attribute values stored in the attribute table 510, in the same manner as if these new attribute values were stored in the base table 500 itself. As shown in the example of attribute metadata table 520 of FIG. 5, the attribute table 520 may include a column that identifies the new attribute, a column that describes the nature of the value of the new attribute, a column that identifies the application that makes use of the new attribute or that is allowed to access the new attribute, a column defining the default value of the new attribute, a column that defines whether the new attribute is enabled or disabled, a column (not shown) that defines whether the new attribute is required (an attribute defining a date is required in most business logic, for example) and/or another column (not shown) that identifies the data type (the JAVA data type, for example) of the new attribute (integer, string, character, Boolean and/or date, for example). By defining the data type of the new attribute stored in the attribute table 510, logic may be implemented to return the new attribute stored in the attribute table 510 (which may be stored as a variable or fixed length character (CHAR or VARCHAR, for example) data type to the accessing application in a format consistent with its expected data type. For example, the data type of the values of the new attributes stored in the attribute table 510 may be of the character type and may have a fixed length of 255 bytes, for example. By including an enable/disable column in the attribute table 510, new attributes stored therein may be disabled, which renders the values associated with the new attribute inaccessible to database applications but does not delete them. Similarly, new attributes that have been disabled may be restored and rendered accessible to database applications by setting the appropriate value of the enable/disable column of the metadata table 520 to enable. The above-described columns are but exemplary columns of such an attribute metadata table 520. In actual use, the nature of the columns thereof will be driven by the business needs of the customer having deployed the database application accessing these tables. Thus, the metadata table 520 may contain all of the columns shown in FIG. 5 at 520, some of them or altogether different columns.

As shown in the example of FIG. 5, the metadata table 520 defines the meaning of the values stored in the attribute table 510: the new attribute Att. 1 is a cell phone number that is used by an identified database application (in this case, an application identified as the "receivables" application). Moreover, the attribute metadata table 520 does not identify any default value associated with the new attribute Att. 1 and tags the new attribute Att. 1 as being enabled. Similarly, the Att. 2 row of the attribute table 510 identifies this new attribute as being the number of dependents, and identifies a database application called "premium estimator" as the accessing database application, and indicates that the new attribute Att. 2 is also an enabled new attribute. Likewise, Att. 3 is a Boolean that is True when the user is a smoker and False when the user is a non-smoker, is a new attribute that is accessed by the "premium estimator" application, has a default value of Yes and is a new attribute that is enabled. In this manner, any kind of information may be stored in the attribute table 510 and the meaning of the information stored in the attribute table 510 may be identified in the attribute metadata table 520. This table architecture allows several database applications to access the same set of tables (including any new attributes in the attribute table 510), without any modification of the source code thereof. Therefore, the source code infrastructure of each application that accesses these tables may be designed to look at the base table 500, the attribute table 510 and the attribute metadata table 520 to retrieve, modify and/or delete any type of information, irrespective of whether the columns of the attribute table 510 were initially defined upon shipping the application, upon installing the application or later when the business needs of the customer change and require the storage and processing of additional information, the nature of which was unforeseen and unforeseeable upon installation.

A base-attribute mapping table 530, according to the present invention, maps the base table 500 with its corresponding attribute table 510. In the example of FIG. 5, the base table 500 is called the user table and the corresponding attribute table 510 is called the new user attribute table. The names of these tables may be freely configurable and may be chosen according to the accessing application. The base-attribute mapping table 530, then identifies the new user attribute table (the attribute table 510) as corresponding to the user table (the base table 500). The database application, therefore, need only look to the base-attribute table 530 to match an attribute table 510 to its corresponding base table 500. As suggested by the base-attribute table 530, a plurality of base tables 500 may map to a corresponding plurality of attribute tables 510. Each base table that has been extended should be registered in the base-attribute mapping table 530, thereby providing a one-to-one mapping of base tables to attribute tables.

According to the present invention, therefore, additional information may be readily stored in the common schema (set of tables that are accessed by multiple applications), without resorting large column-number tables that expand horizontally as additional columns are added to store new attributes. In this manner, inherent column limits need never be approached or reached and the base table(s) may be advantageously maintained in its (their) original compact state(s). Moreover, as the application source code may be written at the outset to make full use of the tables of FIG. 5, adding additional attributes no longer requires adding columns to the base table or tables nor does it require that the application source code be modified to access and operate upon the added information.

There may be instances in which a database application that accesses the common schema needs to define new attributes that must not be shared by any other application. According to an embodiment of the present invention, such an application may create a new base table and a new attribute table. The respective names of the new base table and its corresponding new attribute table may then be registered in the base-attribute mapping table 530. The attribute metadata defining the attributes whose values appear in the new attribute table may be then stored in the attribute metadata table 520. The primary key of the new base table may be used as the new attribute table's foreign key.

Additional extended attributes may also be stored without changing the base table 500, according to an embodiment of the present invention. Such extended attributes may also be called instance-specific attributes, in that that the values thereof may only be valid upon the satisfaction of a predetermined condition embodied in a rule. FIG. 6 is a representation of an extended attribute table 610 and a rules table 620, according to an embodiment of the present invention. The extended attribute table 610 may include columns storing name-value pairs. According to the present invention, the extended attribute table 610 may include two columns and an unlimited number of rows. For illustrative purposes only, the extended attribute table 610 may include a "Favorite Beach" row, which is paired with a corresponding value thereof, namely "Half Moon Beach",for example. Likewise, the name "Favorite Car" may be paired with a corresponding value, such as "Citroen 2CV" in the illustrative example of FIG. 6. To access these rows within the extended attribute table 610, a rules table may be consulted, as shown at 620 in FIG. 6. The rules table 620 codifies logic that identifies the appropriate row or set of rows in the extended attribute table 610. Indeed, the rules table 620 may identify the appropriate row or set of rows in the extended attribute table 610 to be accessed upon evaluation of some predetermined and configurable business logic stored therein. As shown in the example of rules table 620, when the base attribute "State" has a value that is equal to "CA" (California), then the "Favorite Beach" row in the extended attribute table 610 should be accessed. This access, therefore, would return the value "Half Moon Beach" to the accessing application. Likewise, when the base attribute "Age" is greater to or equal to 50, then the value paired with the "Favorite Car" name should be accessed; namely, "Citroen 2CV". The combination of the extended attribute table 610 and the rules table 620 allows the accessing database application to be further customized, in that the application may be configured to traverse the rules table 620 to determine whether an extended attribute or attributes exists for the row in the base table 500 being accessed. If the logic codified in the rules table 620 is not satisfied, then the extended attribute table 610 is not accessed and/or is not valid. Considering now FIGS. 5 and 6 collectively, evaluation of the rules table 620 for user Jones in the base table 510 reveals that the "Favorite Car" row in the extended attribute table 610 that is keyed to Jones' row in the base table 510 should be accessed. Likewise, evaluation of the rules in the rule table 620 reveals that both the "Favorite Beach" and the "Favorite Car" rows in the extended attribute table 610 that are keyed to Smith's row in the base table 500 should be consulted, as both rules evaluate TRUE (Smith's state is CA and Jones is over 50 years of age). When rules within the rules table 620 are deleted or disabled, the corresponding extended or instance-specific attribute(s) within the extended attribute table 610 may also be respectively deleted or disabled, provided no other rule within the rules table 620 uses the involved extended attribute(s). To achieve this, the extended attribute table 610 may use the primary key of the rules table 610 as a foreign key. Other means and/or logic for achieving this result are also possible and are expressly incorporated herewith.

By combining the tables in FIGS. 5 and 6, it is possible to smoothly scale up the base table 500 to any desired level, as the attribute table 510, the attribute metadata table 520, the base-attribute mapping table 530, the extended attribute table 610 and the rules table 620 may be caused to grow in a row-wise (vertical) manner, instead of causing the base table 500 to grow horizontally; that is, by increasing the number of columns thereof. For example, if a database application tracks 5,000 users and it is desired to store another 10 attributes for each of these 5,000 users, then an additional 50,000 attributes must be stored. The present invention allows these extra attributes to be accessed by the database applications in the same manner as it accesses the originally included information in the base table 500, thereby foregoing the necessity of modifying the application source code.

Introducing the added levels of indirection through the use of attribute metadata tables, attribute tables, attribute metadata tables, base-attribute mapping tables, extended attribute tables and rules tables such as shown in FIGS. 5 and 6 may be somewhat performance degrading, as the database application now must access multiple tables to access the required information. To address this performance issue, the present invention, according to an embodiment thereof, proposes pre-fetching all base attributes, extended attribute (s) and metadata for each accessed row in the base table 510 and storing (caching) the pre-fetched information in a predetermined area of memory designated for that purpose. In this manner, all of the information corresponding to the accessed row in the base table may be quickly and locally available to the accessing application. The pre-fetched information may be stored in one or more hash tables along with appropriate logic, for example. Alternatively, in situations wherein not all attributes and/or extended attributes of a base attribute need be fetched, the attribute table 510 and/or the extended attribute table 610 may be accessed only on an as-needed basis. By appropriately querying the tables 500–620, a list of attributes and/or extended attributes may be generated across applications or for any single given application, for example. Moreover, a list of rules governing the extended or instance-specific attributes may be generated, again across all applications or for any given accessing application. Other queries may be formulated to ease the management of all base, new and extended attributes, metadata and rules according to any predetermined criterion or combination of criteria, such as datatype and enabled status, for example.

The present invention may also be configured to support NLS, or National language Support, enabling the present invention to store, process and retrieve data in any selected native language. This insures that the attribute names, error messages, date, time, monetary, numeric, calendar and other national conventions adapt to the native language and the preferred local format in which the application is deployed. The present invention, therefore, allows new and extended attributes to be added to the tables within the common schema and insures that the new and extended attributes (as well as the original base attributes) are translated in the language in which the application environment is set. To achieve this, the present invention may split each table 500, 510, 520, 530, 610 and/or 620 in two tables, each identified by an __B or __TL extension, for example. The __B tables include those tables whose contents should not be translated into the native language and the __TL extension identifies those tables whose content should be translated into the appropriate native language. Logically, however, each pair of __B and __TL tables may form a single table and may be keyed as such. Therefore, the accessing database application, instead of merely accessing the attribute metadata table 520, would access both the metadata__B and the metadata__TL tables to retrieve the metadata of the new attributes of interest. Generally, those attributes that are visible to the user and that may change or be somehow formatted differently may be included in the __TL tables and those attributes that are not visible to the user and that do not change may be included in the __B tables. For example, the "Cell Phone" metadata may be included in the __TL tables, as this metadata may be translated into various languages, such as the French "Téléphone Cellulaire". Similarly, a date attribute may be included in the __TL tables, as the US format is MMDDYY, whereas some other countries favor the DDMMYY format. To implement this NLS support feature, the translatable attributes may be identified by a unique identifier. For example, the Cell Phone attribute may be listed in the __B metadata table as unique identifier ID5. In the __TL metadata table, ID5 may be combined with a user environment language variable and appropriately translated according to the value of this user environment language variable. For example, a row in the __TL attribute metadata table may indicate that if the attribute=ID5 and the user environment language variable=French, then display "Téléphone Cellulaire". The need to access separate __B and __TL tables for NLS support may further degrade the performance of the application in retrieving all of the information corresponding to a row within the base table 510 and/or any corresponding attributes or extended attributes, as an even greater number of tables must be consulted before all of the information stored for that entry in the base table is accessed. Therefore, pre-fetching data and caching the pre-fetched data is recommended, as detailed above.

HARDWARE DESCRIPTION

Figures 1, 2, 3, 4:
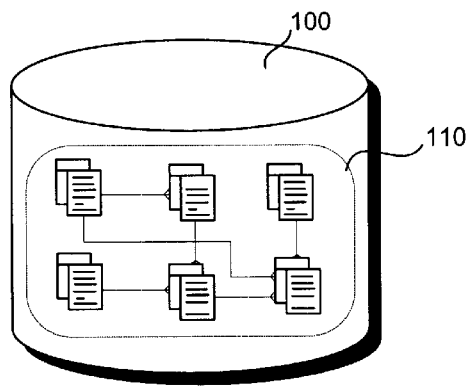
FIG. 1 is a conceptual representation of a database and a schema upon which the present invention may operate.
FIG. 2 is a representation of a database table.
FIG. 3 is a representation of a database table to which an additional column has been added.
FIG. 4 is a representation of a database table that includes additional configurable columns.
Figure 7:
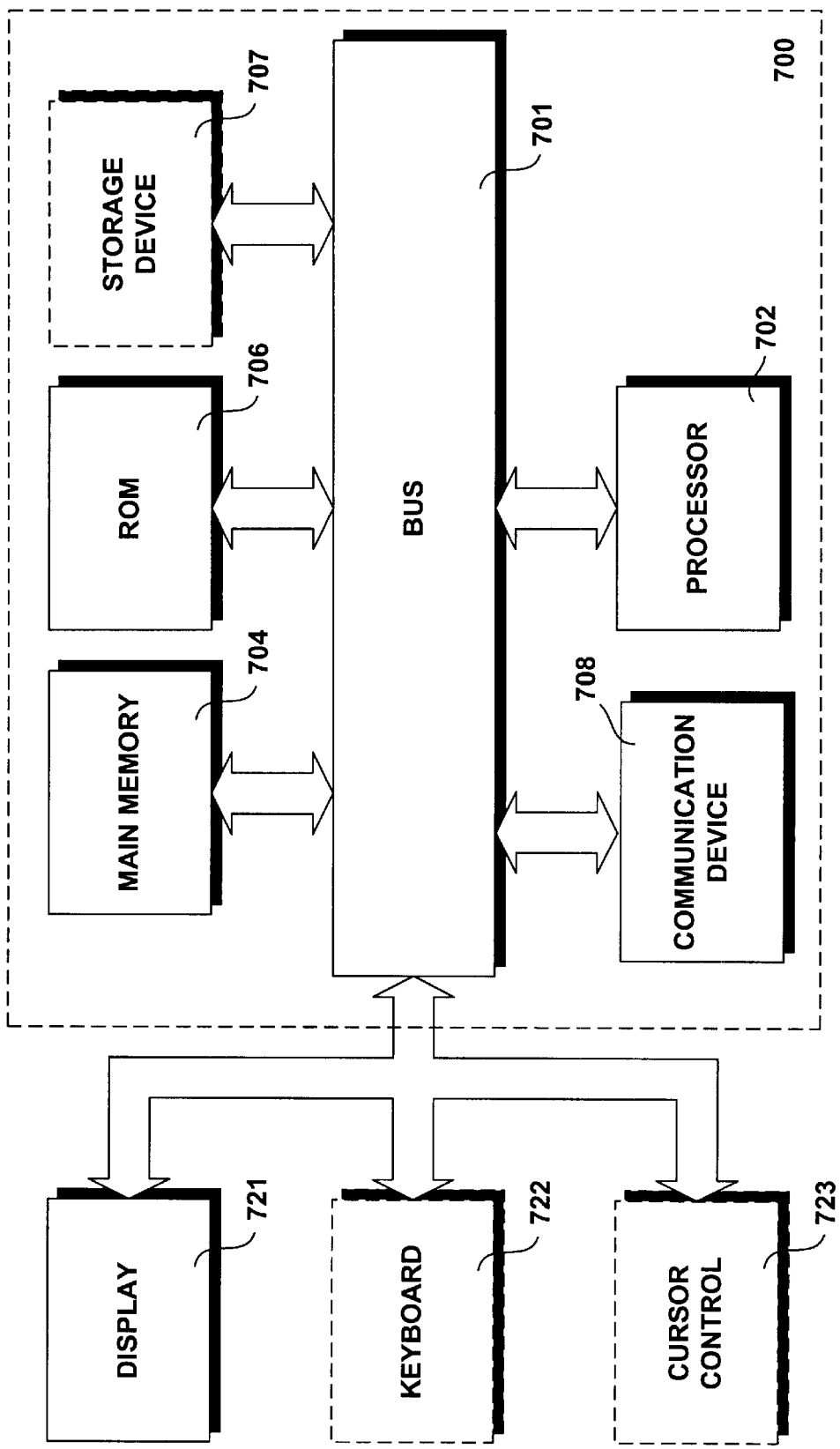
FIG. 7 is a block diagram of a computing device with which the methods of the present invention may be implemented.

FIG. 7 illustrates a block diagram of a computing device 700 with which an embodiment of the present invention may be implemented. Examples of such computing devices are shown at reference numeral 218 and 219 in FIG. 2. Computing device 700 includes a bus 701 or other communication mechanism for communicating information, and a processor 702 coupled with bus 701 for processing information. Computing device 700 further comprises a random access memory (RAM) or other dynamic storage device 704 (referred to as main memory), coupled to bus 701 for storing information and instructions to be executed by processor 702. Main memory 704 also may be used for storing temporary variables or other intermediate information during execution of instructions by processor 702. Computing device 700 may also include a read only memory (ROM) and/or other static storage device 706 coupled to bus 701 for storing static information and instructions for processor 702. A data storage device 707, such as a magnetic disk or optical disk, may be coupled to bus 701 for storing information and instructions. A communication device 708, such as a modem or network (such as Ethernet, for example) card is also coupled to the bus 701 to provide access to a network, such as shown at 712 in FIG. 7.

The computing device 700 may also be coupled via bus 701 to a display device 721, such as a cathode ray tube (CRT), for displaying information to a computer user. An alphanumeric input device 722, including alphanumeric and other keys, is typically coupled to bus 701 for communicating information and command selections to processor 702. Another type of user input device may be user's own voice or cursor control 723, such as a mouse, a trackball, or cursor direction keys for communicating direction information and command selections to processor 702 and for controlling cursor movement on display 721.

The present invention is related to the use of computing device 700 to extend schema objects (such as the base table 500) at runtime. According to one embodiment, this extension may be carried out by one or more computing devices 700 in response to processor(s) 702 executing sequences of instructions contained in memory 704. Such instructions may be read into memory 704 from another computer-readable medium, such as data storage device 707 and/or from a remotely located server. Execution of the sequences of instructions contained in memory 704 causes processor(s) 702 to implement the functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer-implemented method of customizing a database application at runtime, the database application being adapted to access a base table configured to store values associated with a first selected number of base attributes, the method comprising the steps of:
   storing a value associated with a new attribute in an attribute table, the attribute table being configured as a logical extension of the base table and being adapted to store values associated with n new attributes, and
   storing a definition of the new attribute in an attribute metadata table, the attribute metadata table being adapted to store a definition of each of the n new attributes of the attribute table.

2. The method of claim 1, wherein each row in the base table maps to a corresponding row in the attribute table.

3. The method of claim 1, wherein n is a second selected number.

4. The method of claim 1, wherein the attribute table is configured to maintain a number of rows that is equal to a number of rows in the base table.

5. The method of claim 1, wherein the value storing step stores the value in the attribute table as a selected datatype.

6. The method of claim 5, wherein the selected datatype is character (char).

7. The method of claim 1, further comprising the step of storing a base-attribute pair in a base-attribute mapping table, the base-attribute pair mapping a name of the base table to a name of the attribute table.

8. The method of claim 1, further including the step of storing an extended attribute in an extended attribute table, the extended attribute table including a name column configured to store the extended attribute and a value column configured to store an extended attribute value corresponding to the extended attribute, rows of the extended value table being mapped to corresponding rows in the base table.

9. The method of claim 8, further comprising the step of storing a rule in a rules table, an evaluation of the rule determining whether the extended attribute value in the extended attribute table is valid.

10. The method of claim 9, further comprising the step of storing a logical operator, a first operand, a second operand and a selected extended attribute in the rules table, an application of the logical operator to at least one of the first and second operands determining whether the extended attribute value corresponding to the selected extended attribute is valid.

11. The method of claim 10, wherein the first operand includes a selected base attribute, the second operand includes a selectable base attribute value and wherein the logical operator is selected from a group including equal to, less than, less than or equal to, greater than and greater than or equal to.

12. The method of claim 1, further comprising the steps of:
   dividing at least one of the base table, the attribute table, the attribute metadata table, the extended attribute table and the rules table into respective non-translatable tables and respective translatable tables, and
   translating the translatable tables into a selected language.

13. The method of claim 1, further comprising the step of
   dividing the base-attribute mapping table into a non-translatable base-attribute mapping table and a translatable base-attribute mapping table, and
   translating the translatable base-attribute mapping table into a selected language.

14. The method of claim 1, further comprising the steps of
   pre-fetching information corresponding to at least one of a base attribute, a new attribute, an extended attribute and metadata for each accessed row in the base table, and
   storing the pre-fetched information in a predetermined area of memory.

15. The method of claim 1, further comprising at least of the steps of:
   storing an identification of an application that is allowed to access the value associated with the new attribute in the metadata table;
   storing a description of the new attribute in the metadata table;
   storing a default value of the new attribute in the metadata table;
   storing an enabled/disabled status of the new-attribute in the metadata table;
   storing a required/not required status for the new attribute in the metadata table, and
   storing a datatype of the new attribute in the metadata table.

16. A database schema adapted to be modified at runtime, comprising:
   a base table, the base table being configured to store base attribute values associated with a first selected number of base attributes;
   an attribute table, the attribute table being configured as a logical extension of the base table and being adapted to store new attribute values associated with new attributes, and
   an attribute metadata table, the attribute metadata table being adapted to store a definition of each of the n new attributes of the attribute table.

17. The database schema of claim 16, wherein each row in the base table maps to a corresponding row in the attribute table.

18. The database schema of claim 16, wherein n is a second selected number.

19. The database schema of claim 16, wherein the attribute table is configured to maintain a number of rows that is equal to a number of rows in the base table.

20. The database schema of claim 16, wherein the value stored in the attribute table is stored as selected datatype.

21. The database schema of claim 20, wherein the selected datatype is character (char).

22. The database schema of claim 16, further comprising a base-attribute mapping table, the base-attribute mapping table storing a base-attribute pair that maps a name of the base table to a name of the attribute table.

23. The database schema of claim 16, further including an extended attribute table, the extended attribute table including a name column configured to store an extended attribute and a value column configured to store an extended attribute value corresponding to the extended attribute, rows of the extended value table being mapped to corresponding rows in the base table.

24. The database schema of claim 23, further comprising a rules table that is configured to store a rule, an evaluation of which determining whether the extended attribute value in the extended attribute table is valid.

25. The database schema of claim 24, wherein the rules table is configured to store a logical operator, a first operand, a second operand and a selected extended attribute, an application of the logical operator to at least one of the first and second operands determining whether the extended attribute value corresponding to the selected extended attribute is valid.

26. The database schema of claim 25, wherein the first operand includes a selected base attribute, the second operand includes a selectable base attribute value and wherein the logical operator is selected from a group including equal to, less than, less than or equal to, greater than and greater than or equal to.

27. The database schema of claim 24, wherein at least one of the base table, the attribute table, the attribute metadata table, the extended attribute table and the rules table are divided into respective non-translatable tables and respective translatable tables, wherein the translatable tables are adapted to be translated into selected native languages.

28. The database schema of claim 22, wherein the base-attribute mapping table is divided into a non-translatable base-attribute mapping table and a translatable base-attribute mapping table, wherein the translatable base-attribute mapping table is adapted to be translated into selected native languages.

29. The database schema of claim 16, further comprising a cache memory adapted to store pre-fetched information corresponding to at least one of a base attribute, a new attribute, an extended attribute and metadata for each accessed row in the base table.

30. The database schema of claim 16, wherein the metadata table is configured to store at least one of an identification of an application that is allowed to access the value associated with the new attribute, a description of the new attribute, a default value of the new attribute, an enabled/disabled status of the new attribute, a required/not required status for the new attribute and a datatype of the new attribute.

31. A computer system, comprising:
   at least one processor;
   at least one data storage device;
   a plurality of processes spawned by said at least one processor, the processes including processing logic for customizing a database application at runtime, the database application being adapted to access a base table configured to store values associated with a first selected number of base attributes, the processes carrying out the steps of:
      storing a value associated with a new attribute in an attribute table, the attribute table being configured as a logical extension of the base table and being adapted to store values associated with n new attributes, and
      storing a definition of the new attribute in an attribute metadata table, the attribute metadata table being adapted to store a definition of each of the n new attributes of the attribute table.

32. The computer system of claim 31, wherein each row in the base table maps to a corresponding row in the attribute table.

33. The computer system of claim 31, wherein n is a second selected number.

34. The method of claim 31, wherein the attribute table is configured to maintain a number of rows that is equal to a number of rows in the base table.

35. The computer system of claim 31, wherein the value storing step stores the value in the attribute table as a selected datatype.

36. The computer system of claim 35, wherein the selected datatype is character (char).

37. The computer system of claim 31, further comprising the step of storing a base-attribute pair in a base-attribute mapping table, the base-attribute pair mapping a name of the base table to a name of the attribute table.

38. The computer system of claim 31, further including the step of storing an extended attribute in an extended attribute table, the extended attribute table including a name column configured to store the extended attribute and a value column configured to store an extended attribute value corresponding to the extended attribute, rows of the extended value table being mapped to corresponding rows in the base table.

39. The computer system of claim 38, further comprising the step of storing a rule in a rules table, an evaluation of the rule determining whether the extended attribute value in the extended attribute table is valid.

40. The computer system of claim 39, further comprising the step of storing a logical operator, a first operand, a second operand and a selected extended attribute in the rules table, an application of the logical operator to at least one of the first and second operands determining whether the extended attribute value corresponding to the selected extended attribute is valid.

41. The computer system of claim 40, wherein the first operand includes a selected base attribute, the second operand includes a selectable base attribute value and wherein the logical operator is selected from a group including equal to, less than, less than or equal to, greater than and greater than or equal to.

42. The computer system of claim 41, further comprising the steps of:
   dividing at least one of the base table, the attribute table, the attribute metadata table, the extended attribute table and the rules table into respective non-translatable tables and respective translatable tables, and
   translating the translatable tables into a selected language.

43. The computer system of claim 31, further comprising the step of
   dividing the base-attribute mapping table into a non-translatable base-attribute mapping table and a translatable base-attribute mapping table, and
   translating the translatable base-attribute mapping table into a selected language.

44. The computer system of claim 31, further comprising the steps of
   pre-fetching information corresponding to at least one of a base attribute, a new attribute, an extended attribute and metadata for each accessed row in the base table, and
   storing the pre-fetched information in a predetermined area of memory.

45. The computer system of claim 31, wherein the metadata table is configured to store at least one of an identification of an application that is allowed to access the value associated with the new attribute, a description of the new attribute, a default value of the new attribute, an enabled/disabled status of the new attribute, a required/not required status for the new attribute and a datatype of the new attribute.

* * * * *

UNITED STATES PATENT AND TRADEMARK OFFICE
CERTIFICATE OF CORRECTION

PATENT NO.    : 6,574,631 B1  Page 1 of 1
DATED         : June 3, 2003
INVENTOR(S)   : Subramanian et al.

It is certified that error appears in the above-identified patent and that said Letters Patent is hereby corrected as shown below:

<u>Column 12,</u>
Line 9, after "at least" insert -- one --

Signed and Sealed this

Ninth Day of September, 2003

JAMES E. ROGAN
*Director of the United States Patent and Trademark Office*